No. 790,822. PATENTED MAY 23, 1905.
H. T. GALE & R. W. DAVENPORT.
FIRE ALARM APPARATUS.
APPLICATION FILED MAY 7, 1904.
6 SHEETS—SHEET 2.
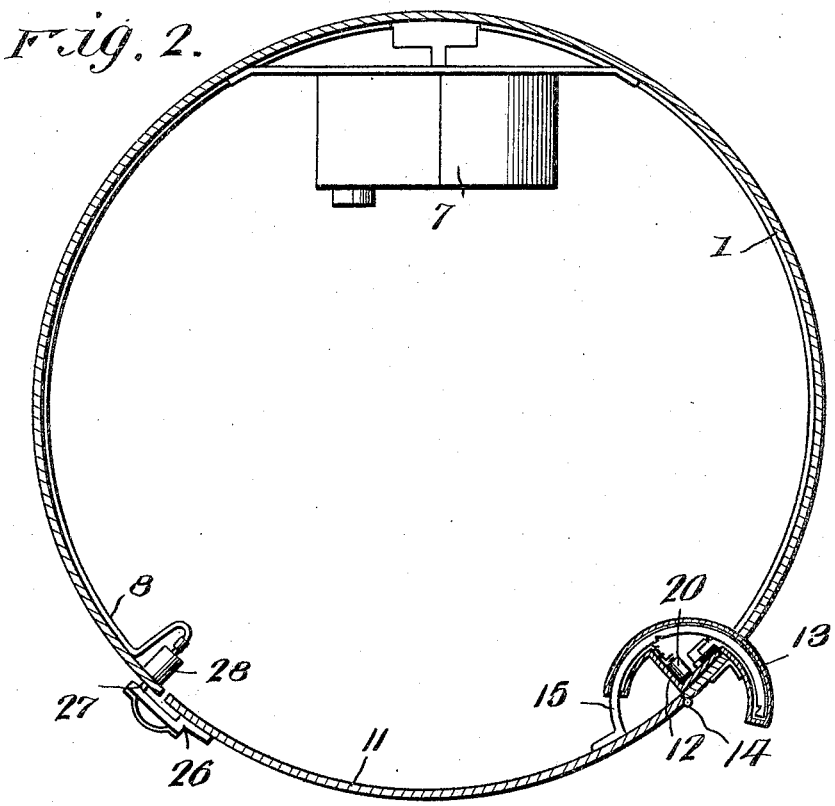
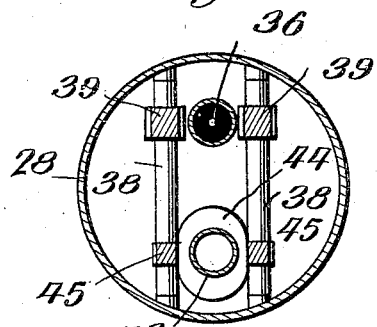

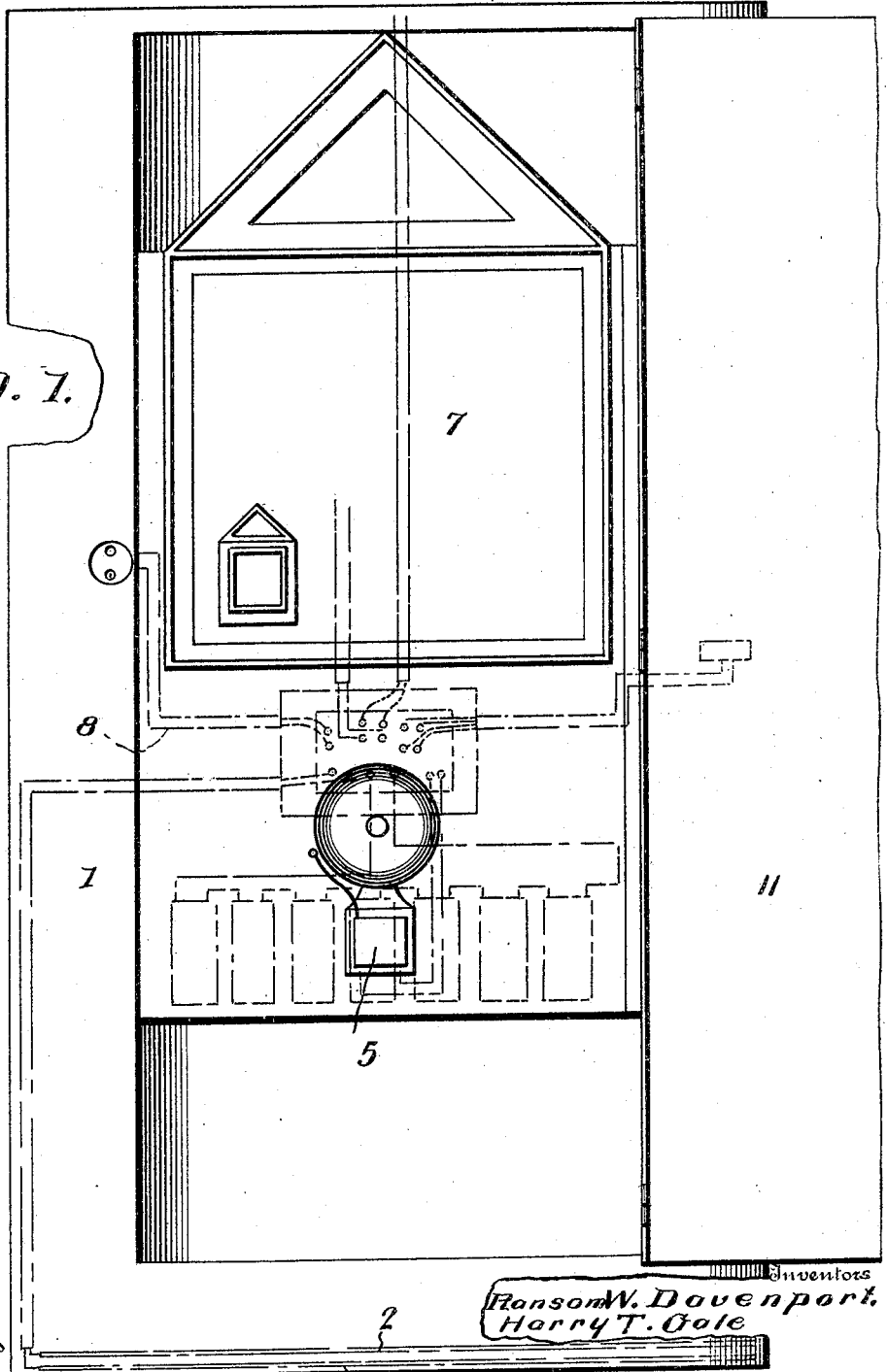

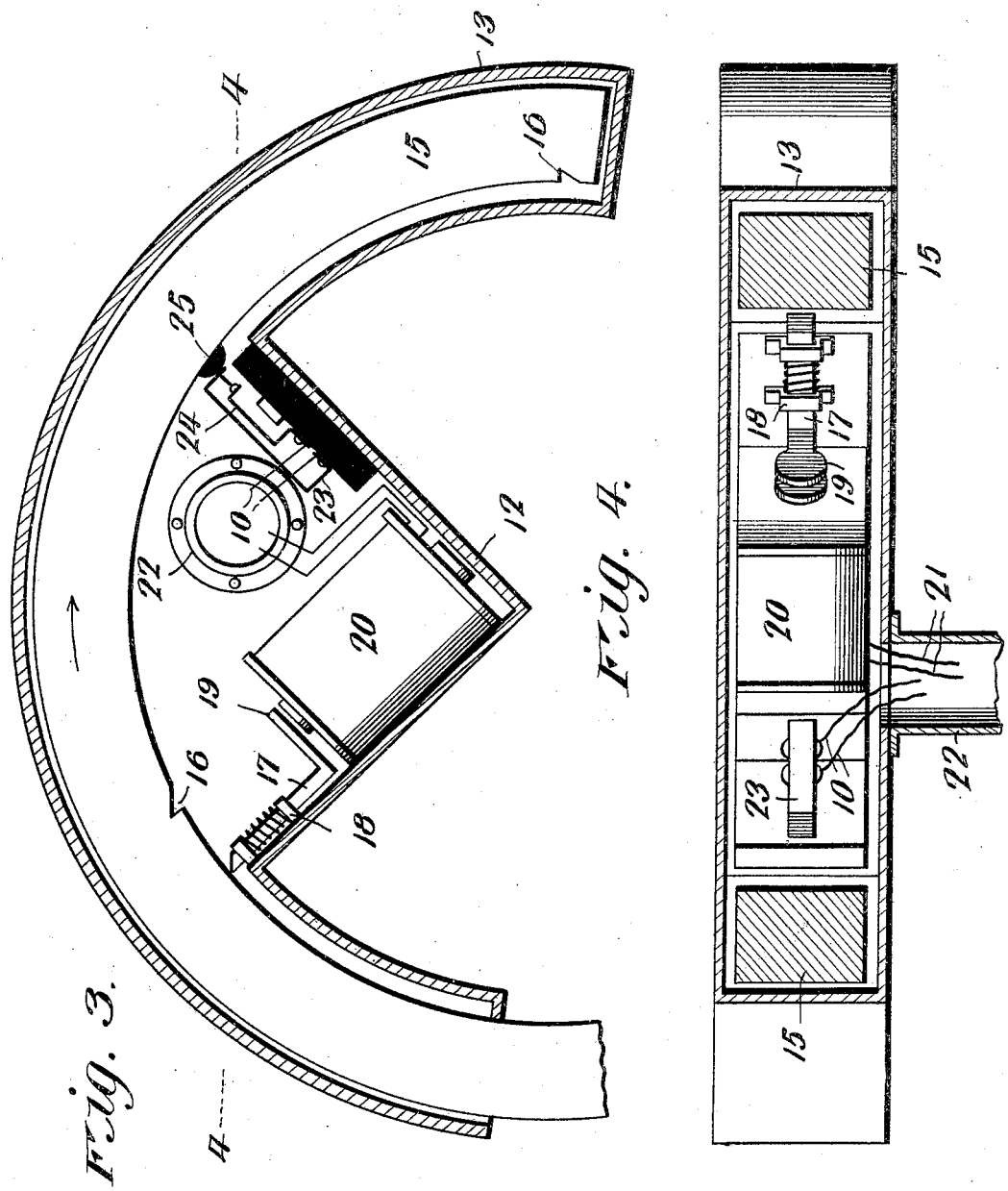

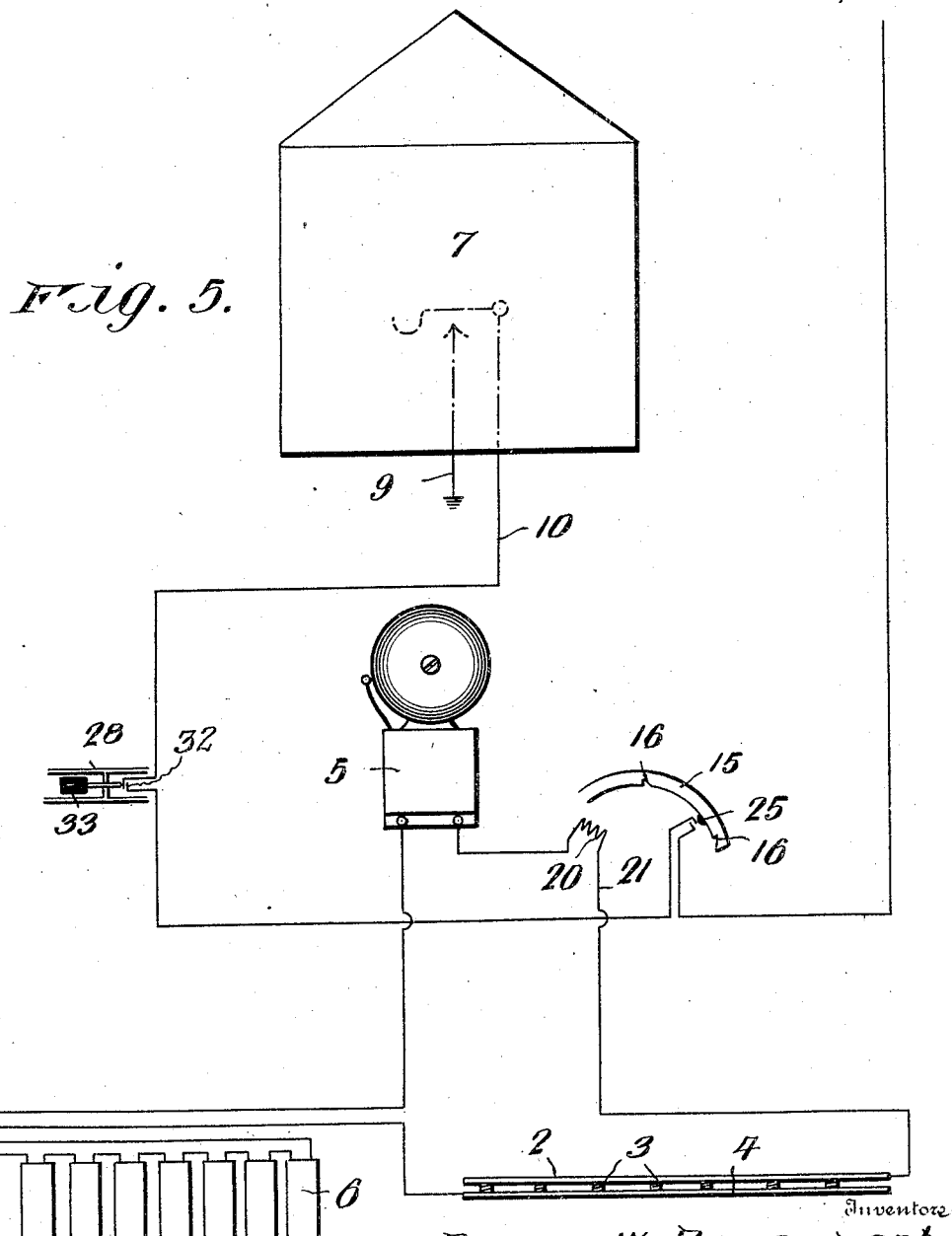

No. 790,822. PATENTED MAY 23, 1905.
H. T. GALE & R. W. DAVENPORT.
FIRE ALARM APPARATUS.
APPLICATION FILED MAY 7, 1904.
6 SHEETS—SHEET 6.
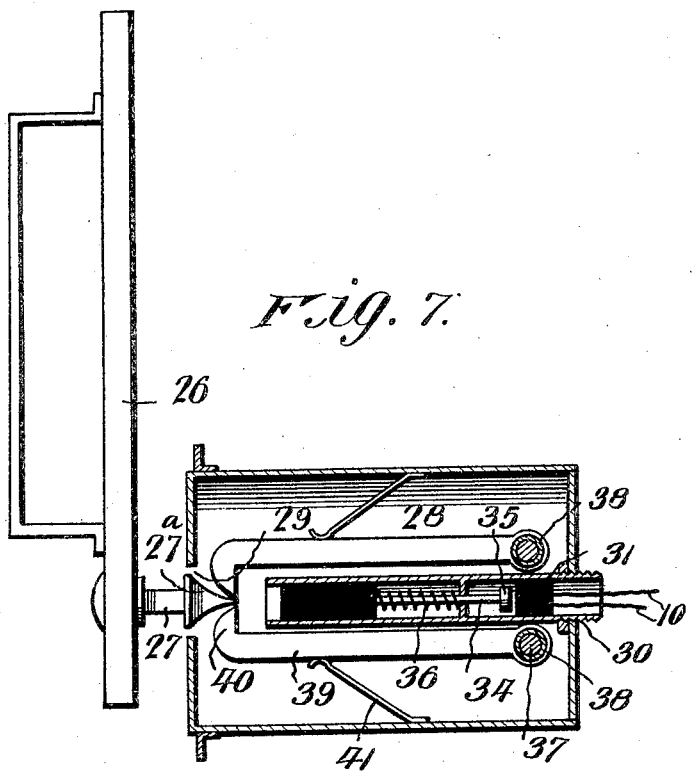
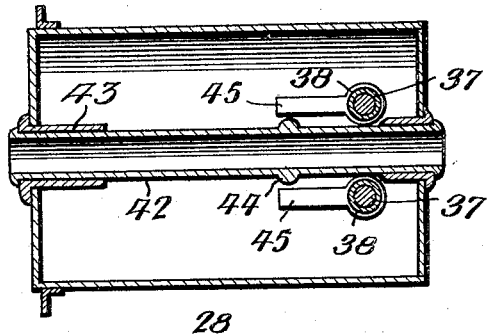
Witnesses
Inventors
Ransom W. Davenport.
Harry T. Gale
By Victor J. Evans
Attorney No. 790,822. Patented May 23, 1905.

UNITED STATES PATENT OFFICE.

HARRY T. GALE AND RANSOM W. DAVENPORT, OF BUFFALO, NEW YORK.

FIRE-ALARM APPARATUS.

SPECIFICATION forming part of Letters Patent No. 790,822, dated May 23, 1905.

Application filed May 7, 1904. Serial No. 206,918.

*To all whom it may concern:*

Be it known that we, HARRY T. GALE and RANSOM W. DAVENPORT, citizens of the United States, residing at Buffalo, in the county of Erie and State of New York, have invented new and useful Improvements in Fire-Alarm Apparatus, of which the following is a specification.

Our invention relates to new and useful improvements in fire-alarms; and its object is to provide mechanism whereby the person sounding the alarm will be forcibly detained until released by an authorized person.

Another object is to so arrange the fire-alarm box within a booth that the circuit in which said box is included will not be completed unless the door of the booth is closed and locked.

Another object is to provide an alarm which will be continuously sounded during the occupancy of the booth.

Another object is to provide a combined lock and circuit-closer which is of novel construction and which is adapted to close the circuit only when the door of the booth is locked thereby and which is adapted to be unlocked from the outside of the booth only.

With the above and other objects in view the invention consists of a booth having any desired form of fire-alarm box arranged therein at a point removed from the door of the booth. This alarm-box is included within a line-circuit in which are arranged two circuit-closers, one of which includes the lock of the door, while the other includes a segment which is movable with the door and is adapted to close the circuit when the door is entirely closed.

The invention also consists of an alarm which is arranged within the booth and which is adapted to be sounded continuously during the occupancy of the booth.

The invention also consists of a lock which will automatically secure the door when the same is closed and which subsequent to such operation closes the circuit through the line-wire in which the fire-alarm is included. This lock can only be opened from the outside of the booth, and a particular form of key must be provided for that purpose.

The invention also consists in the further novel construction and combination of parts hereinafter more fully described and claimed, and illustrated in the accompanying drawings, showing the preferred form of our invention, and in which—

Figure 6:
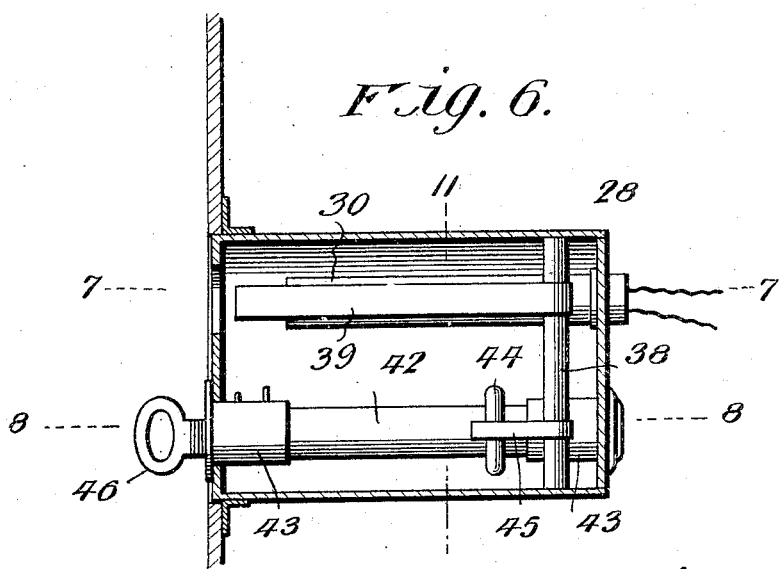
Figure 9:
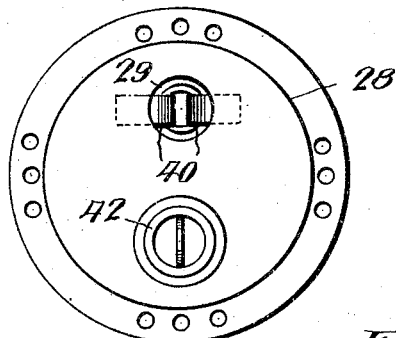
Figure 10:
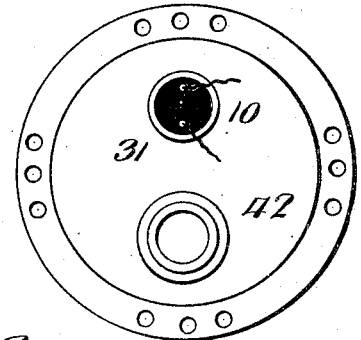
Figure 12:
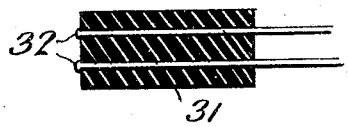

Figure 1 is a front elevation of a booth containing our improved apparatus, the door of the booth being open and portions thereof and of the booth being removed. Fig. 2 is a horizontal section through the booth and showing the door thereof closed. Fig. 3 is an enlarged horizontal section through one of the circuit-closers of the door. Fig. 4 is a section on line 4 4, Fig. 3. Fig. 5 is a diagrammatical view showing the circuits included within the apparatus. Fig. 6 is a vertical section through the lock used in connection with the booth. Fig. 7 is a section on line 7 7, Fig. 6, the tube within the lock being shown in section. Fig. 8 is a section on line 8 8, Fig. 6, the tube being shown in section and the key removed. Fig. 9 is a front elevation of the lock. Fig. 10 is a rear elevation of the lock. Fig. 11 is a section on line 11 11, Fig. 6; and Fig. 12 is an enlarged section through the terminal plug of the lock.

Referring to the figures by numerals of reference, 1 is a booth of any suitable contour and constructed of strong materials, and the floor of this booth has an upper depressible section 2, which is supported by springs 3 or in any other suitable manner and when depressed is adapted to contact and form an electrical connection with a bottom plate 4. An electric bell 5 is arranged within the booth and is included in a circuit with one or more batteries 6 and with the depressible section 2 and the base-plate 4. It will thus be seen that when section 2 is depressed the circuit from the batteries to the bell is closed and the bell will be sounded continuously as long as a person is within the booth. A fire-alarm box 7 and apparatus of any preferred construction is arranged within the booth, and the wires extending therefrom are located within conduits or tubes, which serve to protect them from injury. We have shown these tubes at 8 in Fig. 2 and by dotted lines in Fig. 1. One of the wires, 9, extending from the box is grounded, while the other wire, 10, extends to the lock of the booth-door 11. This wire is also connected to normally open contacts which are arranged adjacent the hinge of the door and which are adapted to be electrically connected only when the door is closed. This wire 10 constitutes the line-wire which is utilized in fire-alarm apparatus. A casting 12 is secured to the inner face of the booth 1 adjacent one of the hinges of the door 11, and this casting has a curved tube 13, formed integral therewith and extending through the booth. This tube is concentric with the door-hinge 14, and therefore permits a curved arm 15, which is secured to the door 11, to slide freely therein, because this arm is also concentric with the hinge 14. Notches 16 are formed in the inner edge of the arm 15 and are adapted to be engaged by a spring-pressed catch 17, which is slidably mounted in ears 18, arranged within the casting 12. A laterally-extending arm 19 is located at the inner end of catch 17 and forms the armature of a magnet 20, which is arranged in the casting 12. This magnet is included in the circuit with the alarm-bell 5, the batteries 6, and the floor of the booth. The wire is arranged within a conduit 22, which projects downward from the casting 12 and serves to protect the wires against injury by the person within the booth. Insulated spring-contacts 23 and 24 are arranged within the casting 12 and are electrically connected to the wire 10 before referred to. These contacts are normally removed from each other and are only electrically connected when the arm 15 has reached the limit of its inward movement within the tube 13. When the arm is in this position, a projection 25, of insulating material, which is arranged upon the inner edge of the arm 15, moves against the contact 23 and presses it inward upon contact 24.

The door 11 has an arm 26 thereon, which is adapted when the door is closed to overlap the adjoining edge of the booth, and this arm has an inwardly-projecting stem 27, provided with an enlarged tapered head 27ª, which is adapted when the door is closed to project through the wall of the booth and into a lock-casing 28, which is secured thereto. This lock-casing is preferably cylindrical and has an inlet-opening 29 at its front end. Secured within the inner end of the casing 28 and in alinement with the opening 29 is a tube 30, in which is arranged a plug 31, of insulating material, having contacts 32 on the inner end thereof. These contacts are electrically connected to the wire 10. A slide 33 is arranged within the tube 30 and has a stem 34, on the end of which is a head 35. A spring 36 incloses the stem and serves to hold the head 35 normally removed from contacts 32.

Parallel rods 37 are located at opposite sides of tube 30 and extend from the top to the bottom of the casing 28. Arranged on each of these rods is a revoluble sleeve 38, and secured to both of these sleeves and movable with them are parallel arms 39, which extend longitudinally along the sides of tube 30 and have inwardly-extending ends 40, which normally assume positions between the inlet 29 and the tube 30. Springs 41 are secured to opposite sides of casing 28 and bear upon the arms 39, thereby serving to hold them normally in the position above described.

Arranged within the casing 28 and below and parallel with the tube 30 is a revoluble tube 42, the ends of which are mounted within fixed sleeves 43. This tube has an oval collar 44 therearound, and overlapping this collar are normally parallel arms 45, which are secured to and are adapted to move with the sleeves 38. Any suitable mechanism (not shown) may be arranged within the front end of tube 42, so as to permit the same to be rotated by the insertion thereinto of a proper key 46.

The door 11 of the booth 1 is normally open and is held in this position by the spring-pressed catch 17, which engages one of the notches 16. It is thus impossible to close the door accidentally, for the reason that in order to do so it would be necessary to slide the arm 15 in the direction of the arrow in Fig. 3, and, as is obvious, this would be impossible if one of the notches was engaged by the catch 17. It will be understood that when the door is open both of the circuits of the apparatus—to wit, the line-circuit and the local circuit—are broken. When a person desires to send in an alarm, he steps into the booth, and his weight upon the section 2 of the floor causes said section to move downward and establish an electrical connection with the plate 4. A circuit is thus formed from the batteries 6 to the bell 5, and said bell is sounded continuously as long as the booth is occupied. The magnet 20 is also energized by the current and attracts its armature 19, and therefore the catch 17 is disengaged from arm 15, and the door 11 can then be swung into closed position. When the door is closed, the projection 25 on arm 15 presses the contact 23 inward against contact 24, and simultaneously with this action the head 27ª of stem 27 moves into the lock-casing 28 and between the ends 40 of arms 39. This head also projects into the tube 30 and presses the slide 33 inward, thereby bringing the head 35 upon the two contacts 32. All of the parts are locked in these positions by the arms 39, which spring into engagement with the head 28 and hold it against removal from the casing. The head 35 by bearing upon the contacts 32 completes the circuit through the line-wire 10, and therefore the fire-alarm can be turned in in the ordinary manner. As no means are provided for unlocking the door from the inside, it will be understood that the person sending in the alarm will be detained within the booth until the arrival of a person authorized to open the booth. To open the same, it is merely necessary to insert a proper key into the tube 42, which may be provided with suitable mechanism whereby said tube will be caused to rotate with the key. As the tube has an oval-shaped collar 44 thereon, the same will spread the arms 45 apart as it rotates, and as these arms move with the arms 39 it will be understood that these last-mentioned arms will also be moved laterally out of engagment with the head 28, and the door can then be readily opened. The springs 41 and 36 will return the parts of the lock to their normal positions. As soon as the door is moved from its closed position the circuit through the line-wire 10 is broken at two points—to wit, at the contacts 23 and 24 within the casting 12 and at the contacts 32 in the lock. As the door is opened it will be automatically locked by the catch 19 to prevent its being accidentally closed. If desired, a police-circuit may also be included in the apparatus, so as to be completed when the door of the booth is closed.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus described the invention, what is claimed as new is—

1. The combination with a booth having a fire-alarm apparatus therein; of a door hinged to the booth, an arm movable with the door and concentric with the hinge, contacts included in a circuit with the fire-alarm apparatus, and means upon the arm and inclosed within the booth for electrically connecting the contacts when the door is closed.

2. The combination with a booth having fire-alarm apparatus therein; of a door to the booth, an arm connected to the door, means for locking the arm against movement in one direction, contacts included in a circuit with the fire-alarm apparatus, means upon the arm for electrically connecting the contacts, and means for disengaging the catch from the arm.

3. The combination with a booth having a fire-alarm apparatus therein, and a door to the booth; of an arm extending from and movable with the door, a spring-pressed catch normally engaging the arm, a magnet, an armature therefor connected to and movable with the catch, contacts included in a circuit with the fire-alarm apparatus, means upon the arm for electrically connecting the contacts, and a circuit-closer included in a circuit with the magnet and a source of electricity.

4. The combination with a booth having fire-alarm apparatus, and a door to the booth; of an arm extending from and movable with the door, a casing for the arm, a magnet within the casing, a spring-pressed catch forming the armature of the magnet and normally engaging the arm, a movable floor-section within the booth forming one contact in a circuit including the magnet and a source of electricity, a second contact in said circuit and below the floor-section, and contacts included in the circuit with the fire-alarm apparatus, and means upon the arm for electrically connecting said last-mentioned contacts when the door is closed.

5. The combination with a booth having fire-alarm apparatus therein, and a door to the booth; of a casing secured to the booth and having an inlet, a tube alining with the inlet, contacts within the tube and included within the circuit with the fire-alarm apparatus, a spring-pressed slide within the tube, a circuit-closing head movable therewith and adapted to bear upon the contacts, oppositely-disposed spring-pressed locking-arms within the casing, and means upon the door for operating the slide and head, said means being adapted to be engaged by the locking-arms.

6. The combination with a booth having fire-alarm apparatus therein, and a door to the booth; of a casing secured to the booth and having an inlet, a tube within the casing and alining with the inlet, insulated contacts within the tube and in circuit with the fire-alarm apparatus, a spring-pressed slide within the tube, a circuit-closing head movable with the slide and adapted to bear upon the contacts, oppositely-disposed spring-pressed locking-arms within the casing, a stem upon the door adapted to project into the casing, and a head thereon for operating the slide and engaging the arms.

7. The combination with a booth having fire-alarm apparatus therein, and a door; of a lock-casing secured to the booth and having an inlet, a tube within the casing and alining with the inlet, insulated contacts within the tube and included within the circuit of the fire-alarm apparatus, a spring-pressed slide within the tube, a circuit-closer movable therewith and adapted to bear upon the contacts, revoluble sleeves at opposite sides of the tube, oppositely-disposed spring-pressed locking-arms extending from the sleeves, releasing-arms secured to the sides, a spreading device interposed between said arms, a stem upon the door, and a head thereon adapted to operate the slide and engage the locking-arms.

In testimony whereof we affix our signatures in presence of two witnesses.

HARRY T. GALE.
RANSOM W. DAVENPORT.

Witnesses:
WESLEY B. GATCHELL,
RANSOM B. DAVENPORT.